US010031981B2

(12) United States Patent
Portilla et al.

(10) Patent No.: US 10,031,981 B2
(45) Date of Patent: Jul. 24, 2018

(54) EXPORTING DATA TO WEB-BASED APPLICATIONS (71) Applicant: International Business Machines Corporation, Armonk, NY (US)

(72) Inventors: Jesus I. Portilla, Erie, CO (US); Ashoo B. Shetty, Novi, MI (US); Michael R. Strickler, Carlisle, PA (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 15/396,849

(22) Filed: Jan. 3, 2017

(65) Prior Publication Data
US 2017/0139936 A1 May 18, 2017

Related U.S. Application Data (63) Continuation of application No. 12/340,323, filed on Dec. 19, 2008, now Pat. No. 9,552,402.

(51) Int. Cl.
*G06F 17/00* (2006.01)
*G06F 17/30* (2006.01)

(52) U.S. Cl.
CPC .... *G06F 17/3092* (2013.01); *G06F 17/30896* (2013.01); *G06F 17/30917* (2013.01)

(58) Field of Classification Search
CPC ........... G06F 17/2247; G06F 17/30011; G06F 17/30604; G06F 17/30923
See application file for complete search history.

(56) References Cited

U.S. PATENT DOCUMENTS

| 6,574,617 | B1 | 6/2003 | Immerman et al. |
| 7,290,206 | B2 | 10/2007 | Wang et al. |
| 2002/0073080 | A1 | 6/2002 | Lipkin |
| 2004/0230620 | A1 | 11/2004 | Lee et al. |
| 2004/0268235 | A1 | 12/2004 | Wason |
| 2005/0097452 | A1* | 5/2005 | Eross ................ G06F 17/30914 715/239 |

(Continued)

OTHER PUBLICATIONS

Zhang et al., "Reforming Computing Education With New Web Technologies", CCSC: Southeastern Conference, pp. 150-156, JCSC 23, 2 (Dec. 2007).

(Continued)

*Primary Examiner* — Andrew T McIntosh
(74) *Attorney, Agent, or Firm* — Schmeiser, Olsen & Watts, LLP; Michael A. Petrocelli (57) ABSTRACT A method and associated system for converting both a tabbed table in an XML format and a collapsible section in the XML format to forms configured for storage in a relational database and use by a web-based application. The tabbed table is a first type of unstructured rich text information in the XML format that is tabbed table specific. The collapsible section is a second type of unstructured rich text information in the XML format that is collapsible section specific. The tabbed table in the XML format is transformed to an XHTML format. The tabbed table in the XHMTL format is exported from the relational database to the web-based application. Storage of the collapsible section in the XHTML format in the relational database is initiated. The collapsible section in the XHMTL format is exported from the relational database to the web-based application.

20 Claims, 4 Drawing Sheets (56) References Cited

U.S. PATENT DOCUMENTS

2007/0180144 A1* 8/2007 Basu ............... G06F 17/30908
709/246
2010/0162100 A1 6/2010 Portilla et al.

OTHER PUBLICATIONS

Buffa et al., "SweetWiki: Semantic Web Enabled Technologies in Wiki", WikiSym '06, Aug. 21-23, 2006, pp. 69-78.
Notice of Allowance (dated Sep. 13, 2016) for U.S. Appl. No. 12/340,323, filed Dec. 19, 2008, Conf. No. 8847.
Amendment (dated Sep. 1, 2016) for U.S. Appl. No. 12/340,323, filed Dec. 19, 2008, Conf. No. 8847.
Office Action (dated Jun. 2, 2016) for U.S. Appl. No. 12/340,323, filed Dec. 19, 2008, Conf. No. 8847.
RCE and PA (Feb. 17, 2015) for U.S. Appl. No. 12/340,323, filed Dec. 19, 2008, Conf. No. 8847.
Office Action (dated Mar. 15, 2011) for U.S. Appl. No. 12/340,323, filed Dec. 19, 2008, Conf. No. 8847.
Final Office Action (dated Jul. 1, 2011) for U.S. Appl. No. 12/340,323, filed Dec. 19, 2008, Conf. No. 8847.
Final Amendment (dated Oct. 3, 2011) for U.S. Appl. No. 12/340,323, filed Dec. 19, 2008, Conf. No. 8847.
Advisory Action (dated Oct. 13, 2011) for U.S. Appl. No. 12/340,323, filed Dec. 19, 2008, Conf. No. 8847.
Examiner's Answer (Nov. 1, 2011) for U.S. Appl. No. 12/340,323, filed Dec. 19, 2008, Conf. No. 8847.
Amendment (dated Jun. 2, 2011) for U.S. Appl. No. 12/340,323, filed Dec. 19, 2008, Conf. No. 8847.
Appeal Brief (Nov. 10, 2011) for U.S. Appl. No. 12/340,323, filed Dec. 19, 2008, Conf. No. 8847.
Reply Brief (Mar. 8, 2012) for U.S. Appl. No. 12/340,323, filed Dec. 19, 2008, Conf. No. 8847.
Dynamic Drive, Tab Content Script, pp. 1-3, 2007, http://www.dynamicdrive.com/dynamicindex17/tabcontent.htm.
XtractPro, Collapsible Panel in HTML, pp. 1-3, Jul. 5, 2007, http://xtractpro.com/articles/Animated-Collapsible-Panel.aspx.

* cited by examiner

EXPORTING DATA TO WEB-BASED APPLICATIONS

This application is a continuation application claiming priority to Ser. No. 12/340,323, filed Dec. 19, 2008.

FIELD OF THE INVENTION

The invention generally relates to a method and system of exporting data and, in particular, to a system and method of exporting data from a client-server, collaborative application to a relational database and/or web based application.

BACKGROUND

Web 2.0 describes changing trends in the use of World Wide Web technology. For example, Web 2.0 aims to enhance creativity, secure information sharing, collaboration and functionality of the World Wide Web. As such, Web 2.0 concepts have led to the development of web-based communities including social networking sites, video sharing sites, wikis, blogs, etc.

The extra functionality provided by Web 2.0 depends on the ability of users to work with the data stored on servers. This can come about through forms in an HTML page, through a scripting-language. The Web 2.0 also permits syndication of site content, which involves standardized protocols that permit end-users to make use of a site's data in another context. Protocols that permit syndication include Extensible Markup Language (XML) based formats such as, for example, RSS (Really Simple Syndication), Resource Description Framework (RDF) and Atom. The XML is a general-purpose specification for creating custom markup languages. The primary purpose of XML is to help information systems share structured data, particularly via the World Wide Web and Web 2.0 applications. By adding semantic constraints, application languages can be implemented in XML, e.g., XHTML amongst thousands of others.

The Web 2.0 supports many types of web services A web service is a software system designed to support interoperable machine-to-machine interaction over a network. The web service definition encompasses many different systems, but in common usage the term refers to clients and servers that communicate over the HTTP protocol used on the World Wide Web. One such service uses XML messages that follow the SOAP standard.

Currently, tools can export data from one application to another application which may be helpful for exporting content to Web 2.0 applications. For example, tools are known to extract HTML content stored in relational databases to Web 2.0 applications. However, these tools lack an intuitive way to map specialized content stored in rich text fields like file attachment metadata, collapsible sections, tabbed tables and hotspot/links used by, for example, Lotus® Domino® program. (Lotus Domino are registered trademarks of International Business Machines Corporation in the United States and throughout the world.) Lotus Domino program is a server product that provides enterprise-grade e-mail, collaboration capabilities, and custom application platform. Lotus Domino program can be used as an application server for Lotus Notes® (Lotus Notes is a registered trademark of International Business Machines Corporation) applications and/or as a web server.

Accordingly, there exists a need in the art to overcome the deficiencies and limitations described hereinabove.

SUMMARY

In a first aspect of the invention, a method implemented on a computing infrastructure comprises extracting unstructured rich text information hosted in a client-server, collaborative application. The method further comprises converting the unstructured rich text information to XML files using a series of XML APIs. The method further comprises transforming the XML files (data) to XHTML using reusable stylesheets unique to each type of unstructured rich text information, and utilizing the XHMTL in a web based application.

In another aspect of the invention, a computer program product comprises a computer usable storage medium having readable program code tangibly embodied in the storage medium. The computer program product is operable to: extract data from unstructured information using a series of XML APIs; convert the extracted data into XML files; and transform the XML files into XHTML documents using unique stylesheets for each type of unstructured information.

In another aspect of the invention, a system for web applications comprises: first program instructions to extract XML files from unstructured rich text information; second program instructions to transform the XML files to XHTML files using reusable tailored stylesheets associated with specific extracted XML files; and third program instructions to save the XHTML files in a relational database and/or for use in a web application. A computer readable media stores the first, second and third program instructions. A central processing unit executes the first, second, third and fourth program instructions.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention generally relates to a method and system of exporting data and, in particular, to a system and method of exporting data from a client-server, collaborative application to a relational database and/or web based application. In implementation, the present invention solves many practical issues that otherwise have curtailed the realization of exporting rich content from Domino or Lotus Notes. More specifically, the present invention provides a mechanism to extract content hosted in Lotus Notes databases to web browsers via a Java-based API. For example, the present invention is configured to exported data as XML files (data) and place such data on either File Systems or relational database management systems (RDMS) with XML capabilities such as, for example, DB2 (version 9). DB2 is part of a family of RDMS of International Business Machine.

Advantageously, the invention provides a tool that is capable of converting various format features of a Lotus Domino database to another database format. In particular, the tool is configured to convert Domino Rich Text Elements like "tabs", "twisties", tables, collapsible sections, as well as other Rich Text Elements to a format exportable to a relational database. To make the conversion, a "stylesheet" is supplied to a known transformation engine such as, for example, an XML transformation engine using Domino XML APIs. The translation engine implements the "stylesheet" which, in turn, provides the conversion translation for exportation into a relational database. The relational database can be, for example, a DB2 relational database maintained, supported, and supplied by International Business Machine Corporation.

The exported data from Lotus Notes database can now be data accessible to J2EE applications such as, for example, Web 2.0 applications. In embodiments, the Domino data is exposed to Web 2.0 rest-based web services and J2EE applications. In this way, it is now possible for users gain easy access to Domino store data by using the mechanism presented in the present invention while preserving much of the content format and metadata.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, infrared, semiconductor system, apparatus, or device. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM), and/or
an optical storage device.

In the context of this document, a computer-usable or computer-readable medium may be any medium that can store the program for use by or in connection with the instruction execution system, apparatus, or device. The computer usable program code may be transmitted using a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
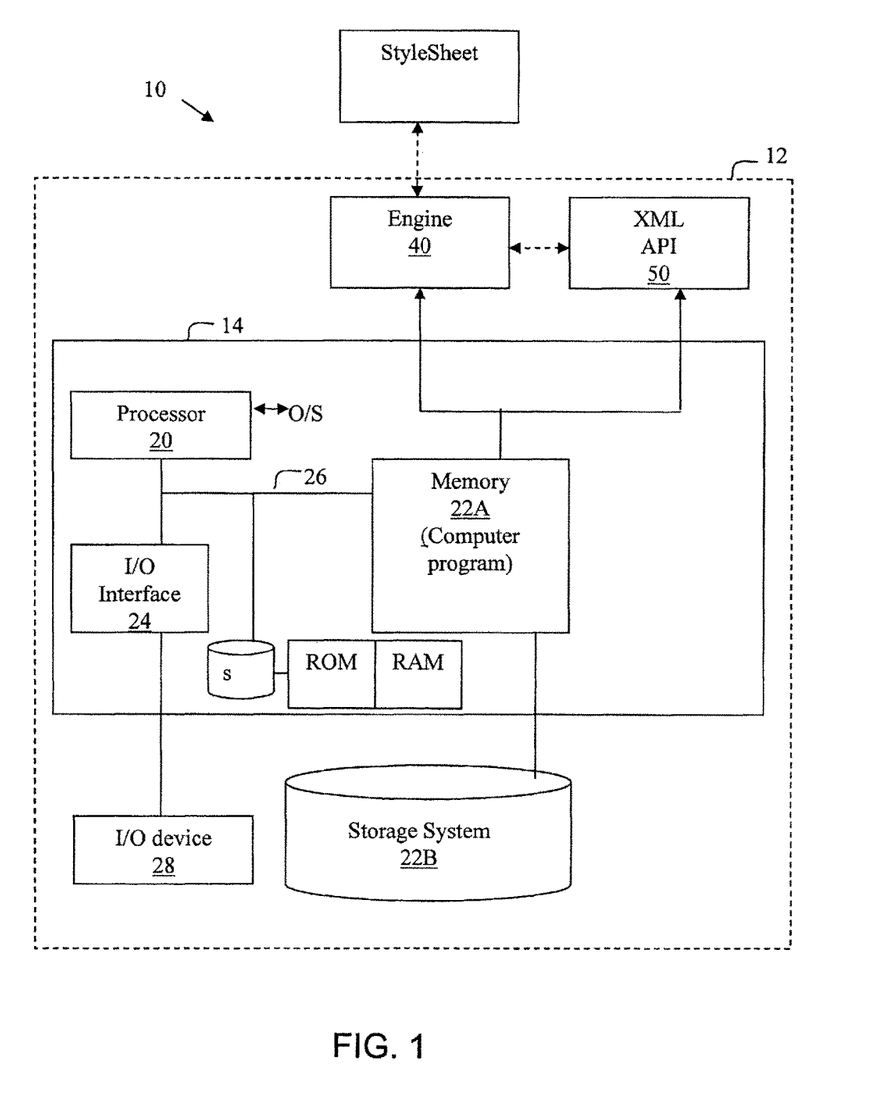
FIG. 1 shows an illustrative environment for implementing processes in accordance with the present invention.

FIG. 1 shows an illustrative environment 10 for managing the processes in accordance with the invention. To this extent, the environment 10 includes a server 12 that can perform the processes described herein using the computer program code. In particular, the server 12 includes a computing device 14. The computing device 14 can be resident on a network infrastructure of any third party service provider (any of which is generally represented in FIG. 1). The computing device 14 and/or the server 12 includes a transformation engine 40 and XML API 50. In embodiments, the XML API 50 may be resident on a Domino (Lotus) server (which can be representative of the infrastructure shown in FIG. 1.)

In implementation, the content of unstructured information such as, for example buttons, figures, tabs, collapsible sections, etc. is extracted/exported from a Domino database through a series of Domino XML exports using the XML API 50. In this way, the content of the unstructured information can be converted to XML files (data). The XML files (data) and any file attachments are saved in file systems or a relational database such as, for example, the storage system 22B of FIG. 1. Thus, in embodiments, data is exported as XML files (data) and placed on either file systems or relational database system with XML capabilities like DB2. File attachments are exported as binary objects and stored in BLOBS (binary large objects) in the relational database; whereas the XML data is stored in CLOBS (common large objects). In embodiments, a unique ID may be provided for each document and file attachment, making it possible to match the appropriate XML file with the corresponding file attachment.

In embodiments, the transformation engine 40 transforms the XML files (data) into XHTML files using stylesheets unique to each type of unstructured information. That is, the Lotus Notes document formatting and metadata is preserved using tailored stylesheets and the Domino XMI API. The Lotus notes document content is stored in XHTML making very accessible for downstream use by J2EE applications and Web 2.0 REST web services.

The stylesheets are designed to be unique for each type of unstructured information such as, for example, collapsible sections, tabbed tables, etc. These stylesheets are designed to be reusable in order to provide an intuitive way to map specialized content stored in rich text fields like file attachment metadata, collapsible sections, tabbed tables and hotspot/links used by, for example, Lotus Domino®.

In embodiments, the stylesheets are uniquely defined and can be stored in a database such as, for example, a storage system depicted in FIG. 1. The unique identification for each stylesheet allows easy access and retrieval by the transformation engine 40 in order to convert the raw data (XML unstructured information). The stylesheet can be identified in many different ways such as, for example, 1. Embedded in the input message: This can be accomplished by specifying a name in the input message body, include an XML-stylesheet processing instruction, which is specified by the XML standard, in the input message body.
2. Specified in the local environment message tree: This can be accomplished by specifying a stylesheet name in the local environment by using a preceding Compute node to define the local environment variable 3. Specified in the Stylesheet property GUI interface: This can be accomplished by filling in the Stylesheet Directory/Stylesheet Name properties in the interface. The node will concatenate the values of these two properties and treat it as a reference to a file in the file system.

By way of non-limiting illustrative example, a contemplated stylesheet for a tabbed table may include the following exemplary code:

```
function tab(tableId,rowId) {
    tableElement=document.getElementById(tableId);
    childCount = tableElement.childNodes.length;
    for(var i=0;i<xsl:text disable-output-escaping="yes"><</xsl:text>childCount;i++){
        if(tableElement.childNodes[i].tagName == "TBODY") {
            //TODO make sure there is only one TBODY
            var tbody = tableElement.childNodes[i];
            var tbodyChildCollection = tbody.childNodes;
            for(var j=0;j<xsl:text disable-output-escaping="yes"><</xsl:text>tbody
ChildCollectionlength;j++){
                if(tbodyChildCollection[j].tagName == "TR") {
                    var row=tbodyChildCollection[j];
                    var id=row.getAttribute('id');
                    if(id==rowId){
                        row.style.display="";
                    }
                    else{
                        row.style.display="none";
                    }
                }
            }
        }
    }
}
```

By way of non-limiting illustrative example, a contemplated stylesheet for collapsible section may include the following exemplary code:

```
<xsl:template match="dxl:section">
    <xsl:variable name="myid" select="generate-id(.)"/>
    <xhtml:p>
        <xsl:attribute
name="class"><xsl:text>id</xsl:text><xsl:value-of select="dxl:sectiontitle/@pardef"/><xsl:text></xsl:text></xsl:attribute>
        <xsl:for-each select="dxl:sectiontitle">
            <xhtml:span onclick="consatina2('{$myid}d','{$myid}i')" id="{$myid}i">
                <xsl:attribute name="style">float:left;<xsl:apply-templates select="dxl:font" mode="font-to-css"/></xsl:attribute>
                <xsl:attribute name="class">expand-link-dark</xsl:attribute>
                <xsl:choose>
                    <xsl:when test="*|text( )">
                        <xsl:apply-templates select="*|text( )"/>
                    </xsl:when>
                    <xsl:otherwise>
                        <xsl:text> </xsl:text>
                    </xsl:otherwise>
                </xsl:choose>
            </xhtml:span>
            <xhtml:div style="clearboth"></xhtml:div>
        </xsl:for-each>
        <xhtml:span id="{$myid}d">
            <xsl:attribute name="style"><xsl:text disable-output-escaping="yes">display:none</xsl:text></xsl:attribute>
            <xst:apply-templates/>
        </xhtml:span>
    </xhtml:p>
</xsl:template>
```

The transformation engine 40 can be, for example, a WebSphere® Message Broker XSL transformation engine. (WebSphere is a registered trademark of International Business Machines Corporation in the United States and throughout the world.) The XSL transformation (XSLT) is a standards-based technology that transforms XML documents into XHMTL documents. Transformation rules for the input XML documents are described in Extensible Stylesheet Language (XSL), which is itself in XML. The XSL transformation rules reside in the stylesheet.

In embodiments, the converted XHTML is saved in a relational database with the unique file attachments. In embodiments, the XHMTL is saved as CLOBS (common large objects) and the file attachments are saved as BLOBS (binary large objects). These CLOBS and BLOBS can then be used for J2EE and Web 2.0 applications.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU. The computing device 14 also includes an I/O device 28. The I/O device 28 can be, for example, any device that enables an individual to interact with the computing device 14 or any device that enables the computing device 14 to communicate with one or more other computing devices using any type of communications link. The external I/O device/resource 28 may be for example, a display of a computing device such as a personal digital assistant (PDA).

In general, the processor 20 executes computer program code, which is stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. In return, the service provider can receive payment from the customer(s) under a subscription and/or fee agreement and/or the service provider can receive payment.

Exemplary Architecture

Figure 2:
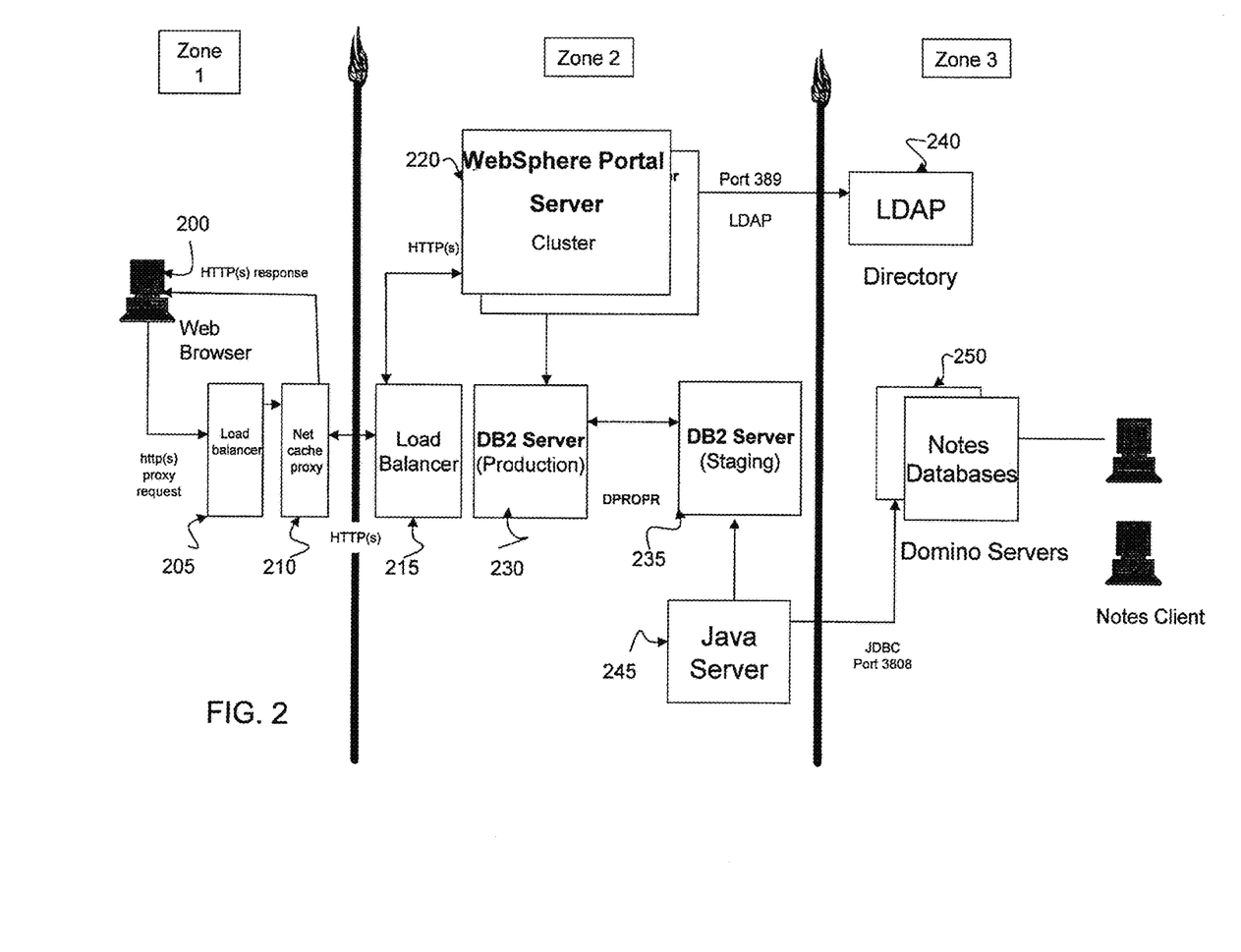
FIG. 2 shows an exemplary architect implementing aspects of the present invention.

FIG. 2 shows an exemplary architecture in accordance with aspects of the invention. In particular, FIG. 2 shows a mechanism to extract content hosted in Lotus Notes databases to web browsers (for Web 2.0 applications) via a Java based API (XML API). Data is exported as XML files (data) and placed on either file systems or relational database system with XML capabilities like DB2. The Lotus Notes document formatting and metadata is preserved using tailored stylesheets and the Domino XMI API. File attachments are sported as binary objects and stored in BLOGS in the relational database.

In particular, FIG. 2 shows a web browser 200. The web browser 200 provides an http request to a load balancer 205. The load balancer 205 is an IP sprayer, which is configured to handle multiple requests. The http request is passed from the load balancer 205 to a net-cache proxy 210. The net-cache proxy 210 is a machine used to cache frequent requested files. The net-cache proxy 210 can provide information related to the request back to the web browser 200.

The net-cache proxy 210 also passes the request to the load balance 215 in Zone 2. This request can then be passed to a portal server (e.g., WebSphere Portal Server) 220. In embodiments, the WebSphere Portal Server 220 is a cluster of two nodes, for example.

The portal server 220 communicates with a DB2 production server 230, which is a server running DB2 production. Information is passed between the DB2 production server 230 and the staging DB2 Server 235. The DB2 staging server 235 is a server running DB2 The portal server 220 also communicates with an LDAP 240. The LDAP 240 (Lightweight Directory Access Protocol) is an application protocol for querying and modifying directly services running over TCP/IP. More specifically, the LDAP 240 is an Internet protocol that email and other programs use to look up information from the server 220. In embodiments, the LDAP represents the directory used for authentication and authorization of users of the present invention (e.g., IBM Directly Server). The DB2 server 235 also communicates with a JAVA Server 245. The JAVA server 245 is a server running JAVA programs, which passes XHTML from the DB2 server 235 and Notes Database 250.

Exemplary Processes

Figure 3:
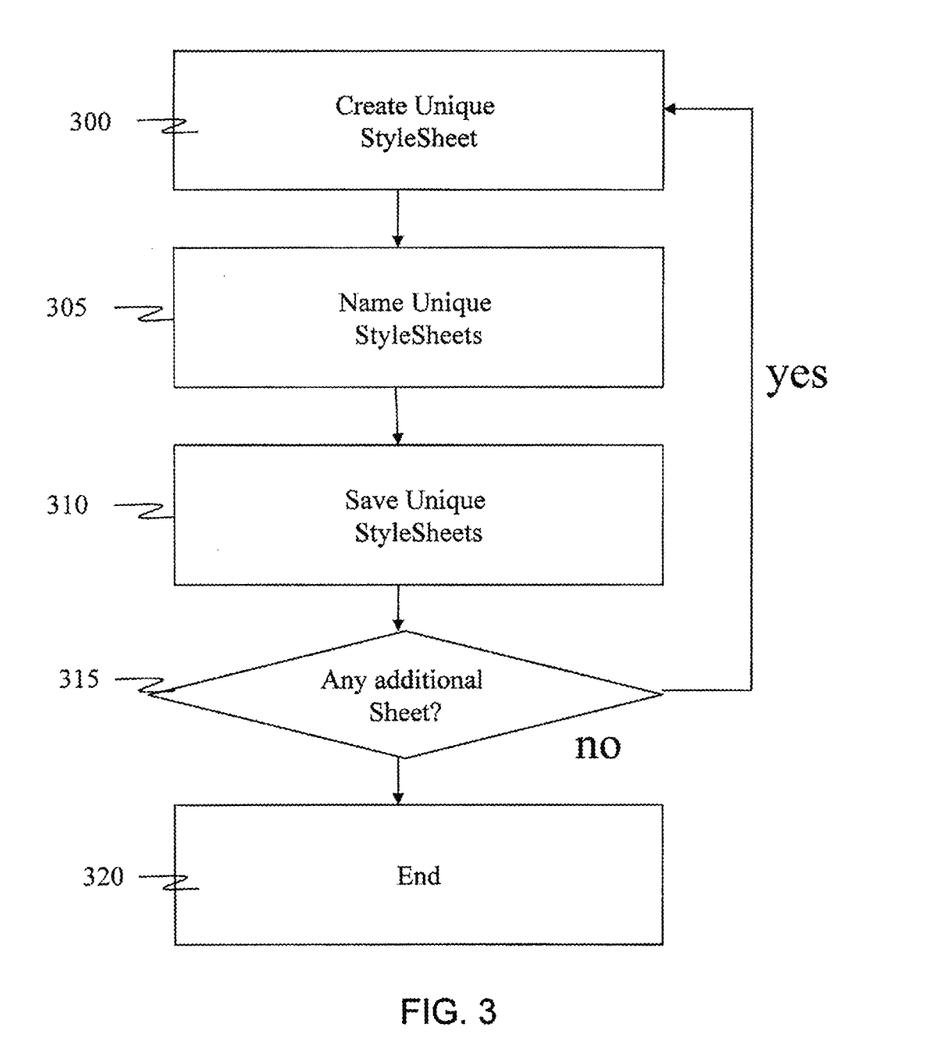
FIG. 3 is a flow diagram showing a program control creating stylesheets in accordance with aspects of the present invention.
Figure 4:
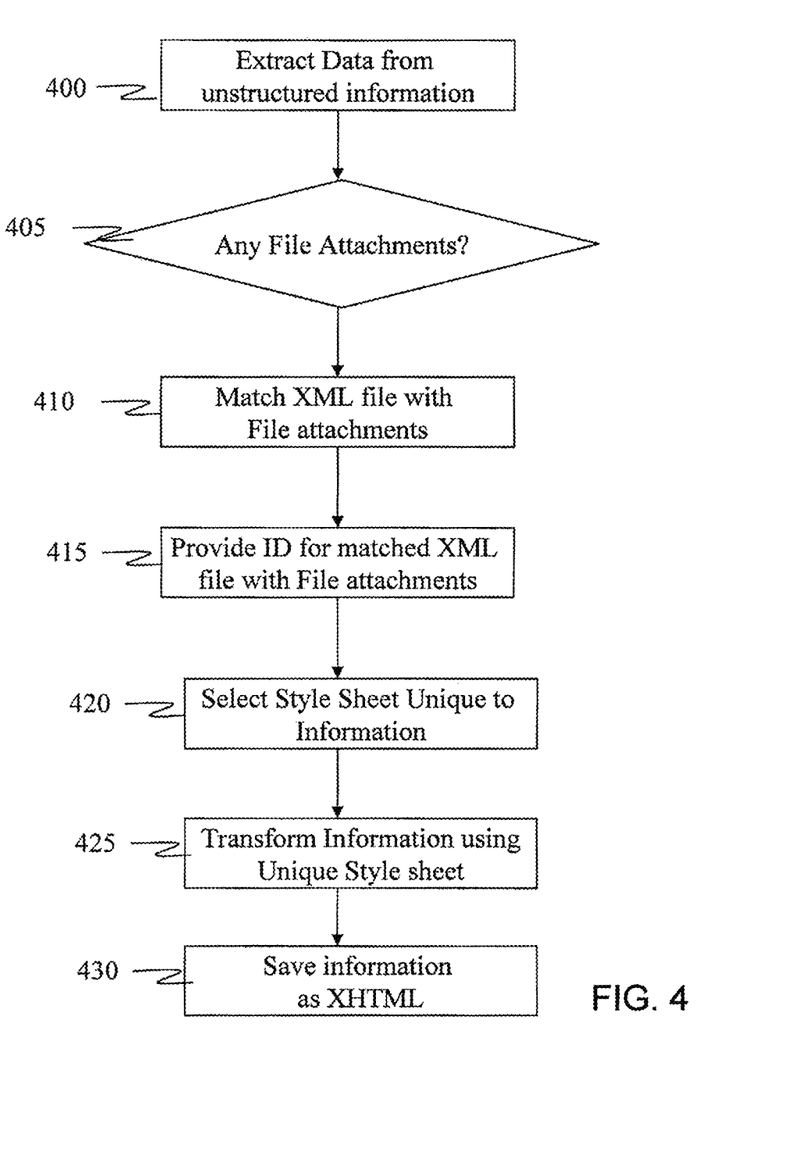
FIG. 4 is a flow diagram showing a program control converting unstructured information in accordance with aspects of the present invention.

FIGS. 3 and 4 illustrate exemplary processes in accordance with the present invention. The steps of FIGS. 3 and 4 may be implemented on the computer infrastructure of FIG. 1 and/or the architecture of FIG. 2, for example. The flow diagrams in FIGS. 3 and 4 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can store the program for use by or in connection with the instruction execution system, apparatus, or device. The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 3 shows a flow diagram depicting the creation of stylesheets. At step 300, the program control creates a stylesheet for a unique unstructured information such as, for example, buttons, collapsible sections, etc. At step 305, the program control provides the stylesheet with a unique identification for later retrieval. At step 310, the program control saves the stylesheet in a storage system such as a database or other file system. At step 315, the program control makes a decision as to whether any additional stylesheets need to be created. If not, the process ends at step 320. If any additional stylesheets are required, the process continues to step 300.

FIG. 4 is a flow diagram showing a process of converting unstructured information in accordance with aspects of the present invention. More specifically, at step 400, unstructured information is extracted and converted to XML data using XML API. At step 405, the program control makes a determination as to whether there are any file attachments associated with the XML files (data). If not, the process continues to step 420. If there are file attachments, at step 410, the program control matches the XML file with the file attachments. At step 415, the program control provides a unique ID to the match so that it can later be retrieved for use in a Web 2.0 or J2EE application. At step 420 and step 425, the program control selects a stylesheet for the particular function, e.g., collapsible section, etc., and using the selected stylesheet the transformation engine transforms the XML to XHTML. At step 430, the program control saves the XHTML in a relational database and/or used in a J2EE or Web 2.0 application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method for converting both a tabbed table in an XML format and a collapsible section in the XML format to forms configured for storage in a relational database and use by a web-based application, said method comprising:

converting, by a processor of a computing device, unstructured rich text information to XML files in the XML format, wherein the unstructured rich text information comprises the tabbed table as unstructured rich text and the collapsible section as unstructured rich text, wherein the tabbed table is a first type of unstructured rich text information that is tabbed table specific, wherein the collapsible section is a second type of unstructured rich text information that is collapsible section specific, and wherein the XML files in the XML format comprise the tabbed table in the XML format and the collapsible section in the XML format;

transforming, by the processor using a first reusable stylesheet that is specific to the first type of unstructured rich text information that is tabbed table specific, the tabbed table in the XML format to an XHTML format configured for storage in the relational database by creating a parent, table object, creating a body for the parent table object to form a container including cells for the tabbed table and creating children of the parent, table object to record information contents of the cells in the container;

initiating, by the processor, storage of the tabbed table object, including the body of the parent table object and the children of the parent table object, in the XHTML format in the relational database;

subsequently exporting, by the processor, the tabbed table, including the body of the parent table object and the children of the parent table object, in the XHMTL format from the relational database to the web-based application;

transforming, by the processor using a second reusable stylesheet that is specific to the second type of unstructured rich text information that is collapsible section specific, the collapsible section in the XML format to an XHTML format configured for storage in the relational database by creating a parent, collapsed object and creating children of the parent, collapsed object to record information content of an uncollapsed form of the collapsed parent object;

initiating, by the processor, storage of the collapsible section in the XHTML format in the relational database; and subsequently exporting, by the processor, the collapsible section in the XHMTL format from the relational database to the web-based application.

2. The method of claim 1, wherein the unstructured rich text information further comprises file attachment metadata as unstructured rich text, wherein the file attachment metadata is a third type of unstructured rich text information that is file attachment metadata specific, wherein the XML files in the XML format further comprise the file attachment metadata in the XML format, and wherein the method further comprises:

transforming, by the processor using a third reusable stylesheet that is specific to the third type of unstructured rich text information that is file attachment metadata specific, the file attachment metadata in the XML format to an XHTML format configured for storage in the relational database.

3. The method of claim 1, wherein the unstructured rich text information further comprises twisties as unstructured rich text, wherein the twisties is a third type of unstructured rich text information that is twisties specific, wherein the XML files in the XML format further comprise the twisties in the XML format, and wherein the method further comprises:

transforming, by the processor using a third reusable stylesheet that is specific to the third type of unstructured rich text information that is twisties specific, the twisties in the XML format to an XHTML format configured for storage in the relational database.

4. The method of claim 1, wherein the unstructured rich text information further comprises buttons as unstructured rich text, wherein the buttons is a third type of unstructured rich text information that is buttons specific, wherein the XML files in the XML format further comprise the buttons in the XML format, and wherein the method further comprises:
  transforming, by the processor using a third reusable stylesheet that is specific to the third type of unstructured rich text information that is buttons specific, the buttons in the XML format to an XHTML format configured for storage in the relational database.

5. The method of claim 1, wherein the unstructured rich text information further comprises hotspot/links as unstructured rich text, wherein the hotspot/links is a third type of unstructured rich text information that is hotspot/links specific, wherein the XML files in the XML format further comprise the hotspot/links in the XML format, and wherein the method further comprises:
  transforming, by the processor using a third reusable stylesheet that is specific to the third type of unstructured rich text information that is hotspot/links specific, the hotspot/links in the XML format to an XHTML format configured for storage in the relational database.

6. The method of claim 1, said method further comprising:
  embedding, by the processor, a first name of the first stylesheet in an input message body of a first input message;
  receiving, by the processor, the first input message and, in response, retrieving, by the processor, the first name of the input message body of the first input message to transform the tabbed table in the XML format to an XHTML format,
  embedding, by the processor, a second name of the second stylesheet in an input message body of a second input message; and
  receiving, by the processor, the second input message and, in response, retrieving by the processor, the second name of the input message body of the second input message to transform the tabbed table in the XML format to an XHTML format.

7. The method of claim 1, said method further comprising:
  specifying, by the processor, a first name of the first stylesheet in a first local environment variable of a local environment message tree;
  retrieving, by the processor, the first name of the first stylesheet from the first local environment variable to transform the tabbed table in the XML format to an XHTML format;
  specifying, by the processor, a second name of the second stylesheet in a second local environment variable of the local environment message tree; and
  retrieving, by the processor, the second name of the second stylesheet from the second local environment variable to transform the collapsible section in the XML format to an XHTML format.

8. The method of claim 1, said method further comprising:
  specifying, by the processor, in a GUI interface, a first Stylesheet Directory property and a first Stylesheet Name property;
  generating, by the processor, a first reference pointing to a first file stored in a file system by concatenating a first value of the first Stylesheet Directory property and a first value of the first Stylesheet Name property;
  retrieving, by the processor, the first stylesheet from the first file, using the first reference pointing to the first file, to transform the tabbed table in the XML format to an XHTML format;
  specifying, in the GUI interface, a second Stylesheet Directory property and a second Stylesheet Name property;
  generating, by the processor, a second reference pointing to a second file stored in the file system by concatenating a second value of the second Stylesheet Directory property and a second value of the second Stylesheet Name property; and
  retrieving, by the processor, the second stylesheet from the second file, using the second reference pointing to the second file, to transform the collapsible section in the XML format to an XHTML format.

9. The method of claim 1, wherein the first stylesheet is configured to process a set of child nodes to process, for each child node, a set of rows of the tabbed table specific to each child node.

10. The method of claim 1, wherein the second stylesheet is configured to process a style and font of the collapsible section.

11. A system, comprising a processor, a memory coupled to the processor, and a computer readable hardware storage device coupled to the processor, said storage device containing program code executable by the processor via the memory to implement a method for converting both a tabbed table in an XML format and a collapsible section in the XML format to forms configured for storage in a relational database and use by a web-based application, said method comprising:
  converting, by the processor, unstructured rich text information to XML files in the XML format, wherein the unstructured rich text information comprises the tabbed table as unstructured rich text and the collapsible section as unstructured rich text, wherein the tabbed table is a first type of unstructured rich text information that is tabbed table specific, wherein the collapsible section is a second type of unstructured rich text information that is collapsible section specific, and wherein the XML files in the XML format comprise the tabbed table in the XML format and the collapsible section in the XML format;
  transforming, by the processor using a first reusable stylesheet that is specific to the first type of unstructured rich text information that is tabbed table specific, the tabbed table in the XML format to an XHTML format configured for storage in the relational database by creating a parent, table object, creating a body for the parent table object to form a container including cells for the tabbed table and creating children of the parent, table object to record information contents of the cells in the container;
  initiating, by the processor, storage of the tabbed table object, including the body of the parent table object and the children of the parent table object, in the XHTML format in the relational database;
  subsequently exporting, by the processor, the tabbed table, including the body of the parent table object and the children of the parent table object, in the XHMTL format from the relational database to the web-based application;
  transforming, by the processor using a second reusable stylesheet that is specific to the second type of unstructured rich text information that is collapsible section specific, the collapsible section in the XML format to an XHTML format configured for storage in the relational database by creating a parent, collapsed object and creating children of the parent, collapsed object to record information content of an uncollapsed form of the collapsed parent object;

initiating, by the processor, storage of the collapsible section in the XHTML format in the relational database; and subsequently exporting, by the processor, the collapsible section in the XHMTL format from the relational database to the web-based application.

12. The system of claim 11, wherein the unstructured rich text information further comprises file attachment metadata as unstructured rich text, wherein the file attachment metadata is a third type of unstructured rich text information that is file attachment metadata specific, wherein the XML files in the XML format further comprise the file attachment metadata in the XML format, and wherein the method further comprises:

transforming, by the processor using a third reusable stylesheet that is specific to the third type of unstructured rich text information that is file attachment metadata specific, the file attachment metadata in the XML format to an XHTML format configured for storage in the relational database.

13. The system of claim 11, wherein the unstructured rich text information further comprises twisties as unstructured rich text, wherein the twisties is a third type of unstructured rich text information that is twisties specific, wherein the XML files in the XML format further comprise the twisties in the XML format, and wherein the method further comprises:

transforming, by the processor using a third reusable stylesheet that is specific to the third type of unstructured rich text information that is twisties specific, the twisties in the XML format to an XHTML format configured for storage in the relational database.

14. The system of claim 11, wherein the unstructured rich text information further comprises buttons as unstructured rich text, wherein the buttons is a third type of unstructured rich text information that is buttons specific, wherein the XML files in the XML format further comprise the buttons in the XML format, and wherein the method further comprises:

transforming, by the processor using a third reusable stylesheet that is specific to the third type of unstructured rich text information that is buttons specific, the buttons in the XML format to an XHTML format configured for storage in the relational database.

15. The system of claim 11, wherein the unstructured rich text information further comprises hotspot/links as unstructured rich text, wherein the hotspot/links is a third type of unstructured rich text information that is hotspot/links specific, wherein the XML files in the XML format further comprise the hotspot/links in the XML format, and wherein the method further comprises:

transforming, by the processor using a third reusable stylesheet that is specific to the third type of unstructured rich text information that is hotspot/links specific, the hotspot/links in the XML format to an XHTML format configured for storage in the relational database.

16. The system of claim 11, said method further comprising:

embedding, by the processor, a first name of the first stylesheet in an input message body of a first input message;

receiving, by the processor, the first input message and, in response, retrieving, by the processor, the first name of the input message body of the first input message to transform the tabbed table in the XML format to an XHTML format, embedding, by the processor, a second name of the second stylesheet in an input message body of a second input message; and receiving, by the processor, the second input message and, in response, retrieving by the processor, the second name of the input message body of the second input message to transform the tabbed table in the XML format to an XHTML format.

17. The system of claim 11, said method further comprising:

specifying, by the processor, a first name of the first stylesheet in a first local environment variable of a local environment message tree;

retrieving, by the processor, the first name of the first stylesheet from the first local environment variable to transform the tabbed table in the XML format to an XHTML format;

specifying, by the processor, a second name of the second stylesheet in a second local environment variable of the local environment message tree; and retrieving, by the processor, the second name of the second stylesheet from the second local environment variable to transform the collapsible section in the XML format to an XHTML format.

18. The system of claim 11, said method further comprising:

specifying, by the processor, in a GUI interface, a first Stylesheet Directory property and a first Stylesheet Name property;

generating, by the processor, a first reference pointing to a first file stored in a file system by concatenating a first value of the first Stylesheet Directory property and a first value of the first Stylesheet Name property;

retrieving, by the processor, the first stylesheet from the first file, using the first reference pointing to the first file, to transform the tabbed table in the XML format to an XHTML format;

specifying, in the GUI interface, a second Stylesheet Directory property and a second Stylesheet Name property;

generating, by the processor, a second reference pointing to a second file stored in the file system by concatenating a second value of the second Stylesheet Directory property and a second value of the second Stylesheet Name property; and retrieving, by the processor, the second stylesheet from the second file, using the second reference pointing to the second file, to transform the collapsible section in the XML format to an XHTML format.

19. The system of claim 11, wherein the first stylesheet is configured to process a set of child nodes to process, for each child node, a set of rows of the tabbed table specific to each child node.

20. The system of claim 11, wherein the second stylesheet is configured to process a style and font of the collapsible section.

* * * * *